Aug. 8, 1950  P. V. HUNTER  2,518,323
BUOYANT ELECTRIC CABLE
Filed Oct. 31, 1940  2 Sheets-Sheet 1
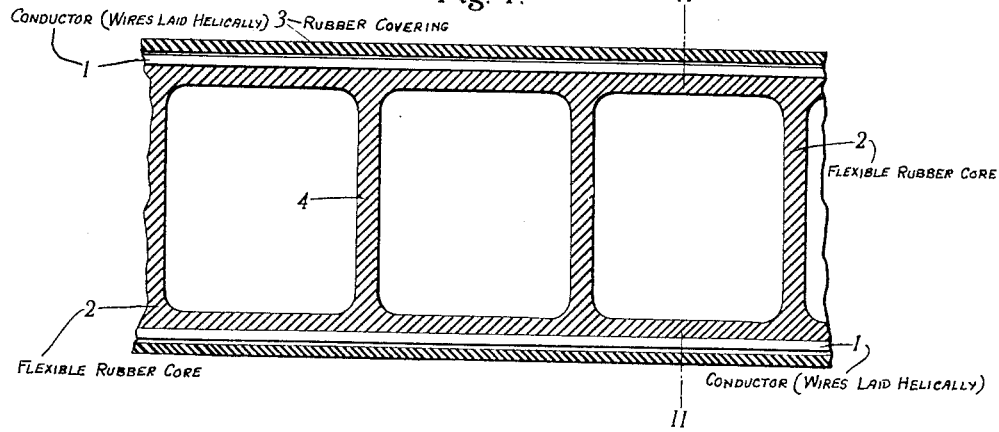
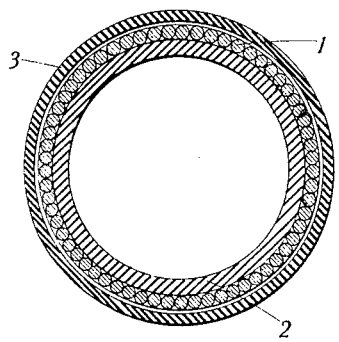
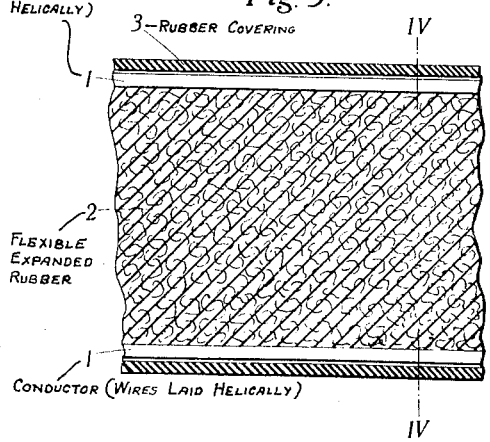
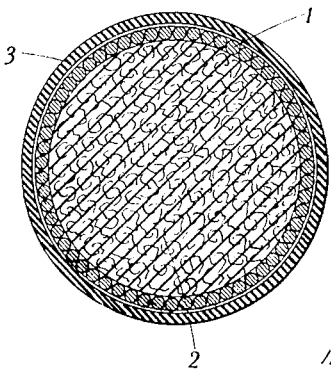
Inventor
Philip Vassar Hunter
by Stebbins and Blenko
Attorney Aug. 8, 1950   P. V. HUNTER   2,518,323
BUOYANT ELECTRIC CABLE
Filed Oct. 31, 1940   2 Sheets-Sheet 2
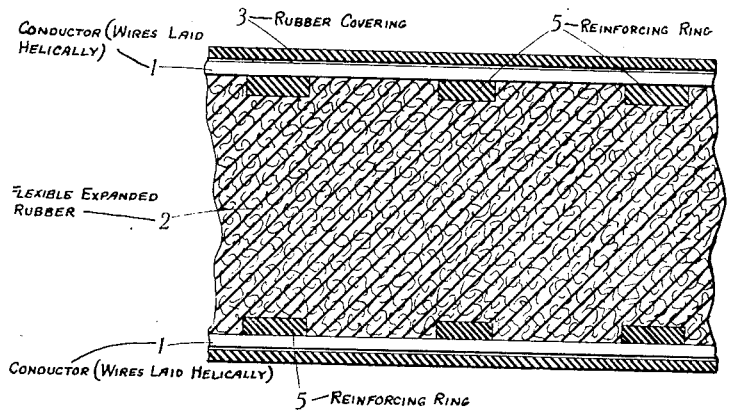
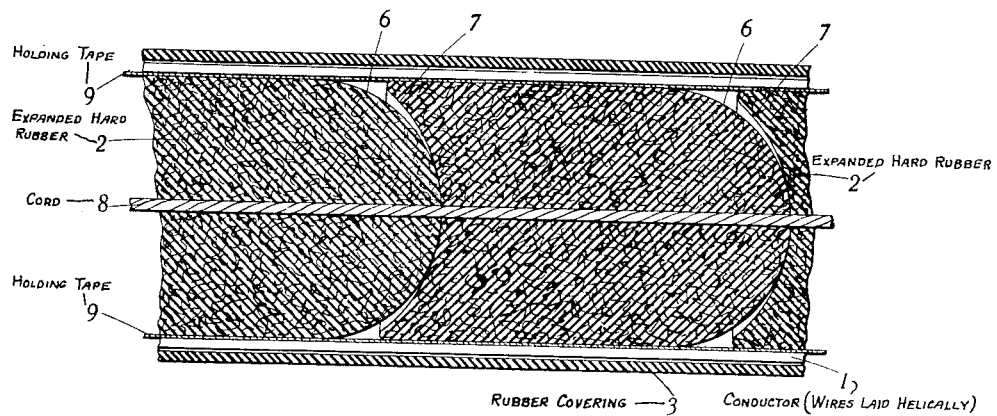
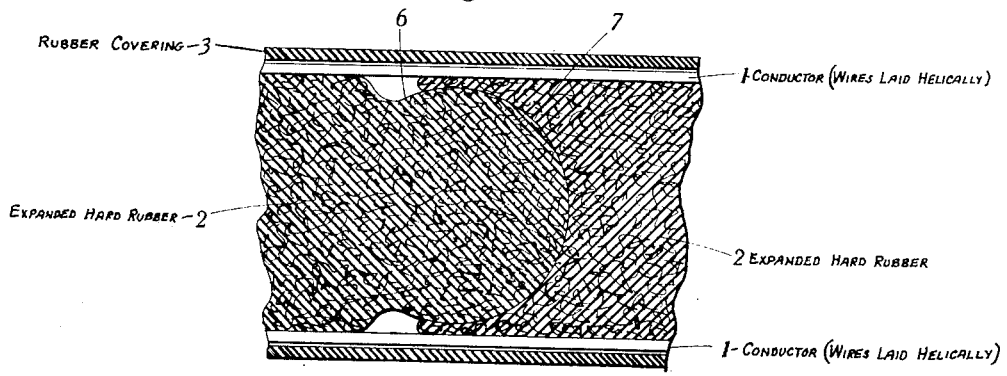
Inventor
Philip Vassar Hunter
by Stebbins and Blenko
Attorney Patented Aug. 8, 1950

2,518,323

UNITED STATES PATENT OFFICE 2,518,323

BUOYANT ELECTRIC CABLE

Philip Vassar Hunter, London, England, assignor, by mesne assignments, to British Insulated Callender's Cables Limited, London, England, a company of Great Britain Application October 31, 1940, Serial No. 363,664
In Great Britain December 20, 1939

10 Claims. (Cl. 174—101.5)

This invention relates to electric cables, particularly those adapted for carrying relatively large currents. A cable constructed in accordance with the invention has sufficient buoyancy to float in water.

The usual combination of a conductor with an insulating covering has a density much greater than water, so that it is evident that some additional element of low average density must be added to the cable structure to produce a buoyant cable. In making the cable in accordance with the present invention a particularly advantageous combination of conductor, insulating covering and buoyant element is produced, which not only fits the cable for carrying large currents on the surface of water, but also makes the cable particularly convenient for handling and highly resistant to deterioration and damage. In this combination the conductor is made to occupy an outer part of the cable forming a tubular layer within which a body of low average density is located. This body is a gas filled cellular structure. The conductor consists of a large number of helically laid wires surrounding the low density core. They are applied over the core by braiding or stranding, preferably the latter.

By sub-dividing a conductor into a large number of relatively small wires, flexibility of the cable is obtained in spite of the fact that the stiffest part of its structure, namely the conductor, is located near its outer surface. The insulating and protective covering which surrounds the conductor and encloses it with the buoyant body is of water-excluding material. Accordingly this enclosure adds to the buoyancy of the cable by including any spaces between conductor and core which are not occupied by solid material. In general, however, it is practicable to design the cable so that it does not depend upon this additional buoyancy to prevent submersion, so that the cable can continue to float even if the outer covering is pierced. Usually this can be regarded as a temporary, but not unimportant, advantage, since piercing of the outer covering would, in most cases, be associated with other damage which would result sooner or later in the deterioration of the value of the insulation or of the conductor, as such.

The improved cable, in addition to its buoyancy, has the advantage that the location of the conductor around the central body and near the surface of the cable gives it great capacity for dissipating heat, particularly when floating in a liquid, so that it can, if necessary, have a very high current rating for the cross section of copper. This is of great practical importance as it reduces the mass of copper required and consequently the buoyancy which has to be provided, thus resulting in a cable of reasonable overall dimensions. Alternatively, aluminium may be used with a rating approximate to that of copper.

There is also the advantage that the buoyancy body being within the conductor is not subjected to an electric field, thus reducing the possibility of the penetration of moisture into or through the walls of the cells.

There is the further advantage that, although the cable is of large diameter for its current-carrying capacity, it is sufficiently flexible for convenient coiling and handling.

The term "cellular" used to describe the central body is to be interpreted broadly. The object of the cellular construction is to sub-divide the internal spaces of the cable so as to establish a number of separate bodies of gas. These may be small or large. Each cell may, for instance, occupy the whole internal diameter of the centre part of the cable, the central body being formed as a tube with transverse partitions at short intervals. It is preferred, however, to have much smaller cells, such as are produced in the so-called "expanded" or "cellular" rubber, where the bodies of gas are of comparatively small size and are separated from each other by thin walls.

In referring to this material the word "expanded" will be used since the word "cellular" is being used herein in its more general sense as above indicated. While the word "expanded" is usually applied to material in which the cells have been formed by the expansion of gas within the material, it is to be understood that in the present specification the word "expanded" is used as defining the final state of the material regardless of the method by which that state was produced.

The word "rubber" as used herein is to be understood to include not only natural rubber but also artificial products having similar characteristics to meet the requirements of the present case.

The cellular body may be formed as a continuous cylinder of sufficiently flexible material, or may be in sections of more rigid material, either separate or attached together, as by being threaded on a cord or attached to an external tape.

The central cellular body may be formed of rubber. The outer covering of the cable is preferably also formed of rubber which must be sufficiently hard and tough to give the necessary protection to the cable. It must also be resistant to the penetration of water.

If the central cellular body is of the flexible continuous kind it may be necessary or advantageous to reinforce it at intervals with rings of more rigid material to give the necessary support to the wires of the conductor when applied over the body.

Where the central body is made in sections of relatively inflexible cellular material, such for instance as expanded hard rubber (ebonite), the length is preferably formed with a rounded portion at one end and a correspondingly shaped socket at the other end so that adjacent lengths fit together with a certain freedom of turning to give the necessary flexibility to the whole assembly. If the central conductor is braided over such a centre it may not be necessary to provide any positive connection between the sections of the central body, these being held in place by the braid and being fed into position as the braid is formed. When they have to be used with a stranded conductor it may be necessary to connect the sections to form a continuous body before passing them through the stranding machine. This may be achieved by making the rounded portion and socket referred to above of interlocking form, or by other means such as previously mentioned herein.

The invention will be further described by the aid of the accompanying drawings which illustrate certain examples of the invention. In these drawings Fig. 1 is a longitudinal section of one form of the improved cable. Fig. 2 is a transverse section of the line II—II of Fig. 1. Fig. 3 is a longitudinal section of an alternative form of the invention and Fig. 4 is a transverse section of the line IV—IV of Fig. 3. Figures 5, 6 and 7 are longitudinal sections of three other forms of construction.

In these drawings the conductor 1 is shown as made up of a large number of wires stranded round the core 2 of low density material. Although the wires are laid helically, no attempt has been made to indicate this in the longitudinal sections. The outer covering of insulating and water-excluding material is indicated by 3.

In the form shown in Figs. 1 and 2 the central core 2 is in the form of a tube with transverse partitions 4 at short intervals. It will be seen that the spacing distance of these partitions is of the same order as the diameter of the tube. The core 2 in this case is made of rubber sufficiently flexible to accommodate the required bending of the cable.

In the form shown in Figs. 3 and 4 the core is formed of flexible expanded rubber which is manufactured in continuous lengths. The actual extent of each length may depend upon the manufacturing process employed. "Continuous" is here intended to indicate having a length equal to many times the diameter of the core.

Fig. 5 shows another example of a cable including a core of flexible expanded rubber. In this example the core is reinforced at intervals by rings 5, on the surface of the core and in contact with the conductor. These rings are made of material of much greater rigidity than the body of the core, such, for instance, as hard rubber or Bakelite. Their function is to support the inward pressure exerted by the wires, both during the stranding operation and subsequently, if the cable is subjected to a pull.

Figs. 6 and 7 show examples of cables in which the core is made of hard material in sections capable of turning relative to each other so as to permit the bending of the cable. In these cases the core is made of expanded hard rubber (ebonite). In each case one end 6 of each section is convex and the other end 7 is concave. The two ends fit together and permit relative turning of adjacent lengths so that the cable can be bent freely.

The lengths of material forming the core are connected together to form a continuous body primarily for the purpose of producing a body which can be fed readily into the stranding machine. In Fig. 6 the sections of the core 2 are threaded on a central cord 8 and are also attached to two external tapes 9. Generally it will not be necessary to use both these methods of connection in the same cable. They have been shown here together as a matter of convenience. Either of the two methods will suffice for establishing the necessary continuity of the body.

In Fig. 7 the convex end 6 and the concave end 7 of the sections are so shaped that they interlock to form ball and socket joints. The socket is slightly more than a hemisphere in extent and can easily be sprung over the ball and when so sprung will maintain the necessary continuity for handling and feeding into the stranding machine.

What I claim as my invention is:

1. An electric cable comprising a central flexible cellular core, an annular flexible conductor formed of a large number of helically laid wires surrounding said core, and an insulating and water-excluding covering surrounding and enclosing the conductor, the whole forming a flexible cable which will float on water.

2. In a buoyant electric cable, comprising an annular conductor formed of helically laid wires, an insulating and water-excluding covering surrounding said conductor and a flexible cellular core substantially filling the space within said conductor the said core being a tube with transverse partitions at short intervals.

3. In a buoyant electric cable, comprising an annular conductor formed of helically laid wires, an insulating and water-excluding covering surrounding said conductor and a flexible cellular core substantially filling the space within said conductor the said core having a rubber structure comprising a multitude of very small cells separated from each other by thin walls.

4. In a buoyant electric cable, comprising an annular conductor formed of helically laid wires, an insulating and water-excluding covering surrounding said conductor and a flexible cellular core substantially filling the space within said conductor the said core being a body of flexible cellular material having in the outer part thereof rings of rigid material as support for the conductor.

5. In a buoyant electric cable, comprising an annular conductor formed of helically laid wires, an insulating and water-excluding covering surrounding said conductor and a flexible cellular core substantially filling the space within said conductor the said core being a continuous length of flexible cellular material having reinforcing means to prevent excessive radially inward compression thereof.

6. In a buoyant electric cable, comprising an annular conductor formed of helically laid wires, an insulating and water-excluding covering surrounding said conductor and a flexible cellular core substantially filling the space within said conductor the said core comprising rigid cellular material in short lengths, the lengths being free to turn relative to each other to permit easy bending of the cable.

7. In a buoyant electric cable, comprising an annular conductor formed of helically laid wires, an insulating and water-excluding covering surrounding said conductor and a flexible cellular core substantially filling the space within said conductor the said core comprising expanded hard rubber in short lengths which are free to turn relative to each other to permit easy bending of the cable.

8. In a buoyant electric cable, comprising an annular conductor formed of helically laid wires, an insulating and water-excluding covering surrounding said conductor and a flexible cellular core substantially filling the space within said conductor the said core comprising rigid cellular material in short lengths, each length having one end rounded convexly and the other end rounded concavely so that they fit together with freedom for relative turning.

9. In a buoyant electric cable, comprising an annular conductor formed of helically laid wires, an insulating and water excluding covering surrounding said conductor and a flexible cellular core substantially filling the space within said conductor and comprising short lengths of cellular material and means for holding the said lengths together end to end.

10. A buoyant flexible electric transmission cable having a buoyant core, an electrical conductor formed about said core, insulating and waterproofing means for said conductor, said core comprising a plurality of individual flexible block members, the ratio of the weight and volume of said blocks providing a sufficient positive water-buoyancy to support the added weight of the conductor insulating and waterproofing means each of said block members being sufficiently renitent to prevent unexcessive inwardly directed radial forces from deforming said cable.

PHILIP VASSAR HUNTER.

REFERENCES CITED

The following references are of record in the file of this patent:

UNITED STATES PATENTS

| Number | Name | Date |
|---|---|---|
| 1,667,510 | Coe | Apr. 24, 1928 |
| 2,048,811 | Peirce | July 28, 1936 |
| 2,175,389 | Hanff | Oct. 10, 1939 |

FOREIGN PATENTS

| Number | Country | Date |
|---|---|---|
| 18,536 | Netherlands | Aug. 15, 1928 |
| 830,980 | France | May 23, 1938 |